Patented Jan. 10, 1939

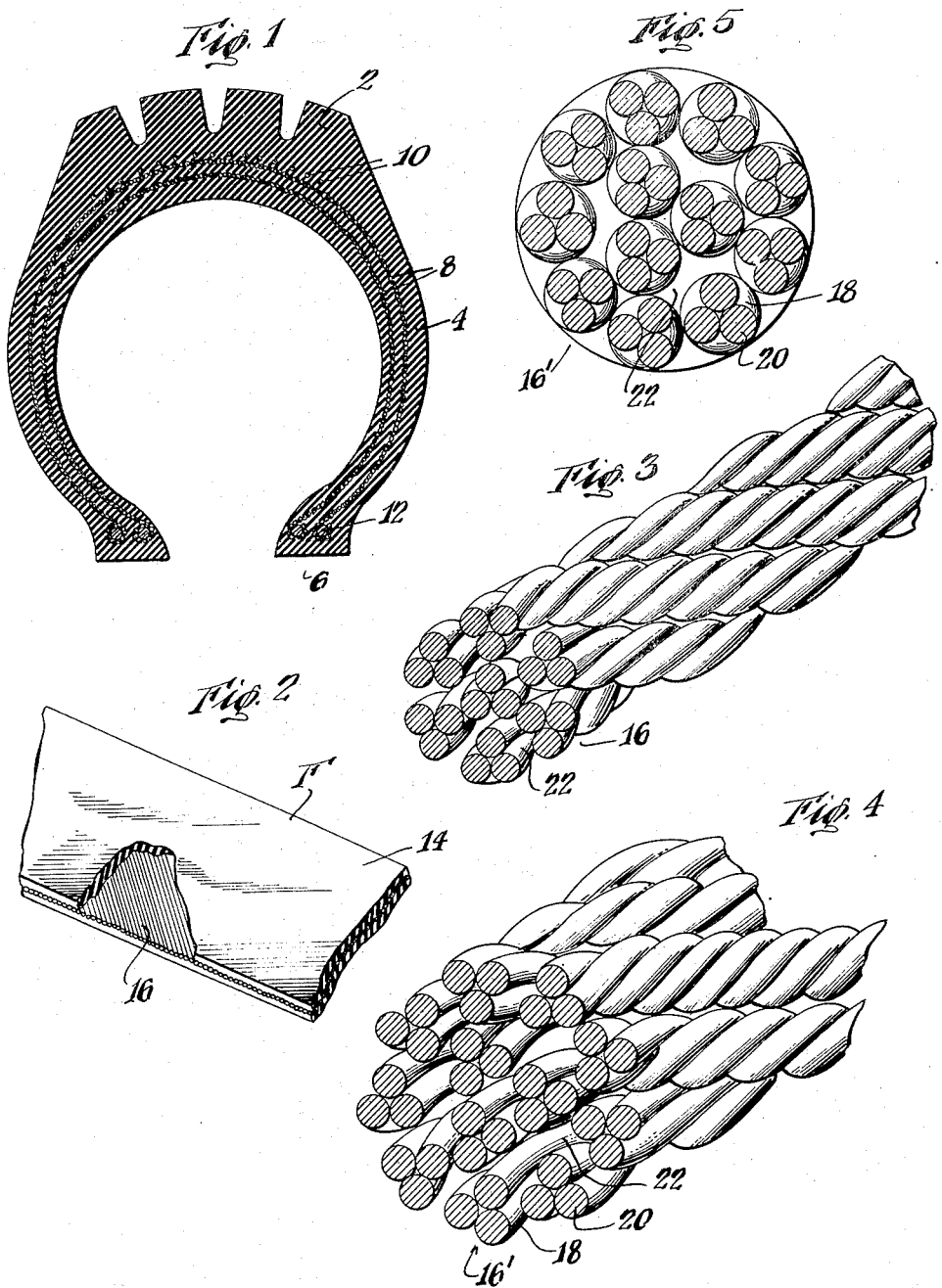

2,143,694

UNITED STATES PATENT OFFICE 2,143,694

PNEUMATIC TIRE CASING AND PROCESS OF MAKING SAME

Jacques Maurice Theodore Hauvette, Clermont-Ferrand, France, assignor to Michelin et Cie, Clermont-Ferrand, France, a corporation of France Application March 11, 1937, Serial No. 130,231

6 Claims. (Cl. 154—14)

This invention relates to pneumatic tire casings and has particular reference to tire casings in which metallic cables are used as stress resisting elements.

The use of metallic reinforcements in tires, such as metal plates, wires and cables, has been suggested heretofore. Theoretically such metal reinforced tires should have great mileage life and durability, but as a practical matter they never have been successful due to certain inherent disadvantageous characteristics, such as inflexibility, a tendency to split and crack, and breakage of the metallic reinforcements. The splitting and cracking is caused by the severe treatment that tire casings undergo during service. The casing is subject to almost constant flexing, so that with the reinforcements merely embedded in the casing, the rubber is easily torn loose from the reinforcements and a sawing action takes place, due to relative movement between the cables and casing, ultimately separating the casing into a plurality of distinct unsupported layers of rubber. Upon splitting or cracking, moisture enters between the plies contacting the metallic reinforcements, thereby causing them to deteriorate through rusting, and allowing the casing to blow out. Furthermore, the reinforcing elements heretofore used in tire casings have been insufficiently flexible and resilient to withstand repeated bending without breaking.

Tire casings containing textile fabric plies have certain inherent characteristics in their construction which greatly decrease their mileage life. Textile fabric plies are of insufficient strength particularly when used in large truck tires to allow the tires to be constructed with thin highly flexible side walls. A great number of such plies are required to produce sufficient tire casing strength and consequently both the side walls and the tread portions are rendered thick and inflexible. With such thick casings excessive heat is generated by internal friction in the rubber layers between the plies causing deterioration of the fabric and the rubber. Not only that, but due to the thickness of the casing great variation in flection occurs between the inner portion and outer portion of the casing. As the fabric plies are relatively inextensible the thin layers of rubber between the plies are forced to carry and compensate for all the differences in flection and eventually the rubber is sheared along lines between the plies thus weakening the tire and allowing it to blow out long before its effective service life should be terminated.

The present invention relates to pneumatic tire casings having metallic cables embedded therein in such a manner as to produce a substantially homogeneous light weight carcass of thin cross section having highly flexible side walls of at least as great strength as textile fabric tires of the same size.

More specifically, the invention preferably includes the use of cables of peculiarly flexible nature which are made up of a plurality of strands, each strand being in turn composed of a plurality of twisted filaments. The individual strands being composed of entirely twisted filaments are extremely flexible and have great tensile strength. By utilizing such cables in a tire, the number of layers of the same may be greatly reduced, as few as two layers being sufficient in most cases even for the large truck tires.

It has been found that the cables suitable for use in tire casings must have certain characteristics not present in metallic cables made at the present time. These characteristics may be outlined as follows:

1. Great tensile strength with small cross sectional area.
2. Resistance to permanent deformation when bent.
3. Resistance to permanent deformation when compressed or stretched.
4. Resistance to breakage upon repeated bending.
5. Great surface area in proportion to cross sectional area so that a greater bonding surface is available for adhesion to the rubber of the tire carcass.

Cables made at the present time have been designed largely to have the characteristics of high tensile strength and resistance to permanent deformation upon bending. All of these cables have a center core element around which are twisted a plurality of wires or wire assemblies called strands, almost all of the strands themselves having a core. These cables may be suitably divided into three classes: (a) Cables consisting of a center core wire around which are twisted one or more layers consisting of a plurality of wires in each layer; (b) Cables consisting of a plurality of strands containing a center core wire and twisted about a center core strand having a center wire core; (c) Cables having a textile core. The cables of class (a) have great strength but because of their closely twisted nature penetration of rubber into the interior of the cable is prevented. Such cables do not bond well to the rubber. The cables of the type defined under (b) are also subject to the same disadvantages. In the cables defined under (c) there is a tendency for the textile core to become extended permanently and also this core absorbs moisture which is a cause of corrosion in the cables. The cables of classes (a) and (b) are, furthermore, too inflexible for satisfactory operation in a tire casing. The cores are straight wires and consequently resist extension or compression of the cables. Likewise, the cores resist bending of the cable because they resist extension of the filaments at the outer portion of the bend and compression of the filaments at the inner portion of the bend. Furthermore, tensile stresses applied to core-containing cables are carried more by the core than by the other filaments, thereby resulting in breaking of the core wires and ultimate breakdown of the entire cable.

A class of cables has been discovered and perfected which fulfills the requirements for use in the manufacture of tires, that is, they have great tensile strength, are not readily deformed by bending and stretching, withstand a large number of repeated bendings without breaking and present a great surface area to which rubber may be bonded. These cables consist more specifically of a plurality of strands twisted together, each strand in turn consisting of a plurality of twisted filaments with no center core filament in either the strands or the cables. Such twisted strands when twisted together form a completed cable having many comparatively large interstices into which the rubber may penetrate thereby permitting contact between the rubber and practically the entire surface area of each of the filaments of the cable. The rubber in and surrounding the cables cushions each of the filaments during its movement in the tire and acts to reduce the friction between them. The absence of core filaments also allows greater freedom of movement of the individual filaments. Each filament is twisted and when tension or compression is applied to them they may straighten or compress, respectively. If bent, the portions of filaments on the outer side of the cable may straighten and the portions on the inner side may compress, thus rendering the cable very flexible, extensible and compressible, and equalizing the stresses throughout the cable.

In addition to the use of such cables in a tire it has been discovered that by bonding the rubber of the tire carcass to the cables in such a manner that adhesion of the rubber to the cables is greater than the cohesive strength of the rubber, breakdown through separation of the cables from the rubber is effectually avoided. Any suitable manner of bonding the rubber to the cables may be used to produce the desired adhesive strength, such treatment of the rubber and of the cables being preferably conducted during the formation of the metallic cables into rubber containing plies which are ultimately built up with additional rubber plies and tread portions to produce the completed carcass.

When the carcass has been formed into the desired shape it may be vulcanized in a known manner, thereby causing the rubber plies, the tread portion, and the rubber-containing metal plies to fuse together to produce a substantially solid mass of rubber with the individual cables passing therethrough; each filament of the cable being almost completely surrounded by strongly adhering rubber and being capable of individual movement in response to distortion of the tire. The great strength of the cables reduces the number of layers or plies of cables used in a tire casing to give the requisite load carrying strength. The reduction in number of plies decreases side wall thickness and renders the casings far more flexible than fabric ply casings. The reduction in thickness also decreases the amount of frictional heat generated, and allows more efficient dissipation of the heat that is generated. The cables are highly conductive and conduct the heat generated by internal friction to the thin side walls where the heat may radiate to atmosphere.

The casing is not only of great strength and flexibility but is also characterized by resistance to cuts since objects too large to pass between the cables will be unable to penetrate entirely through the casing because of inability to sever the metallic cables.

In addition to the foregoing, such cable reinforced tire casings are of materially less weight than the textile fabric ply tires now marketed. The reduction of the weight of the tires, resulting in a reduction of the unsprung weight of the vehicle, to a considerable degree results in greater efficiency of operation and better riding qualities than in a vehicle having textile fabric ply tires of the same dimensions.

For a better understanding of the invention reference may be had to the accompanying drawing, in which:

Figure 1 is a view of a vertical section of a pneumatic tire casing embodying one form of the invention;

Figure 2 is a perspective view of a ply embodying the invention, partly broken away to show details of the same;

Figure 3 is a greatly enlarged perspective view of one type of cable suitable for use in a tire;

Figure 4 is a greatly enlarged perspective view of a modified form of cable; and Figure 5 is an end view of the cable disclosed in Figure 4.

Illustrative of one form of the invention, Figure 1 discloses a section of a tire casing including a tread 2, side walls 4 and bead portions 6. Embedded in the side walls 4 of the tire and extending over the tread portion 2 are shown two layers 8 of metallic cables. While the modification illustrated includes only two layers, it will be understood that, depending largely upon the size and type of the tire casing desired, more than two layers may be used without rendering the side wall portions 4 unduly stiff. However, truck tires of the largest size now in use have been manufactured and used with great success containing only two or four plies or two or four layers of metallic cables. In balloon tires for passenger vehicles, two plies or layers of very flexible and thin cables may be used to produce highly flexible tires. For truck tires of substantially the same size, a greater number of layers of thin cables may be used, or since the tires are used at greater pressures, it may be desirable to use thicker and less flexible cables. If desired, layers containing cables of different thicknesses may be used. Also, a breaker strip layer 10 of metallic cable may be used under the tread portion of the tire as illustrated in Figure 1. The metallic cable layers 8 may be brought down to the bead portion 6 and wrapped around the bead wires or bead cables 12 in the usual manner.

The metallic cable layers 8 are preferably originally made in the form of a rubber-containing fabric such as is shown in Figure 2, the rubber 14 being rubber latex or in an unvulcanized state. The plies may be made by arranging a plurality of spaced substantially parallel cables 16 or 16' under uniform tension on a suitable form. These cables, as shown in Figures 3 to 5, may suitably consist of strands 18, each strand being made up of three or more twisted filaments 20. The filaments 20 are preferably twisted around each other, there being no center core filament as is usual in cable constructions. The number of strands 18 used in making the completed cable may vary considerably. As shown in Figure 3, the cable 16 may consist of seven strands twisted together. The cable 16', illustrated in Figures 4 and 5, may consist of twelve twisted strands. The individual filaments 20 may be varied in diameter in accordance with the number of filaments and strands used to produce cables of substantially the same diameter regardless of the number of strands 18 and filaments 20, or different numbers of filaments of larger or smaller sizes may be used to produce larger or smaller cables, depending upon the service conditions to which they may be subjected. As best shown in Figure 4, practically the entire surface area of the filaments 20 is exposed to the rubber 14 enclosing them in the completed ply. In addition, the irregular shape of the twisted strands produces large interstices 22 between the filaments 20, into and through which rubber can readily penetrate during the ply forming operation and during subsequent vulcanization. Each of the filaments is therefore almost completely surrounded by films of rubber, these films and small areas of rubber passing continuously from one side of the cable to the other in unbroken form.

The cables 16 and 16' because of their twisted formation and lack of any core filaments are capable of ready bending because the individual filaments and the strands may move relatively to each other. These cables are highly flexible and have great tensile strength.

The penetration into and contact of the rubber with the surfaces of the cables is not relied upon solely to bond the cables to the tire carcass. In order to bond the rubber in the completed tire very strongly to the cable 16, the rubber 14 of the ply or the cables themselves, or both, may be treated in any suitable manner to cause very strong adhesion between them upon vulcanization. The rubber may be bonded to the cable in any suitable manner to product an adhesion between them that is stronger than the cohesion of the rubber. The bond must be such that repeated stresses, the heat generated in the tire during use, the subjection of the tire to cold, as in the winter, and chemical action between the rubber and the cables will not cause the bond to fail.

After the rubber and/or the cable layer have been suitably treated, they may be pressed together, for example by forcing them between pressure rolls, to squeeze the rubber into the interstices of the cables and to produce a self supporting fabric F of unvulcanized rubber 14 and metallic cable 16, as shown in Figure 2.

The completed plies F may be built into the tire in the usual way, that is by superimposing layers of the fabric F and rubber upon a mold form, core or a drum, thereafter shaping the casing to its final desired form and vulcanizing in the usual mold. When the plies are cut on the bias as shown in Figure 2, the cables will extend diagonally across the plies and when used in a tire carcass will extend diagonally across or around the carcass.

The final vulcanizing step causes the rubber of the fabric F, the rubber plies and the tread to flow together, substantially completely surrounding all of the filaments of the cable, penetrating entirely through the cables and vulcanizing the rubber firmly thereto, thus producing a casing of homogeneous rubber containing strongly adhering individually movable cables, the filaments of which are cushioned and separated by thin films of rubber.

It will be understood from the foregoing that a tire has been produced which overcomes the difficulties of internal shearing and breakage of reinforcements encountered by the prior known types of metal and textile reinforced tire casings. Tire casings embodying the present invention have been found in actual use to have a mileage life greatly in excess of the textile fabric ply tires now on the market.

It will be understood that there can be many variations made in the manner of bonding the cables to the tire carcass, that the type of cable can be varied, and that the tread and side wall portions may be constructed in any manner desired, without departing from the invention. Therefore, the desired embodiment should be considered as illustrative only and not limiting the scope of the invention as defined in the following claims.

I claim:

1. A pneumatic tire casing comprising a rubber carcass having tread, sidewall and bead portions, at least one layer of cables consisting of a plurality of twisted coreless metallic strands imbedded in the carcass and bonded to the rubber of the carcass so strongly that the adhesion of the cables to the rubber is at least as strong as the cohesive strength of the rubber, whereby separation of the rubber from the cables is avoided, said cables extending diagonally across the carcass from adjacent one bead portion to adjacent the other bead portion.

2. A pneumatic tire casing comprising a rubber carcass having embedded therein a plurality of layers of multiple strand cables, each strand being coreless and formed of a plurality of twisted metallic filaments, each strand being bonded to the rubber of said carcass so strongly that their adhesion is at least as great as the cohesion of the rubber, whereby separation of the rubber from the cables is avoided.

3. A pneumatic tire casing comprising a rubber carcass having tread, sidewall and bead portions, a plurality of cables embedded in the carcass and extending from adjacent one bead portion to adjacent the other bead portion, each cable consisting of a plurality of twisted coreless strands and each strand consisting of a plurality of twisted metallic filaments, the rubber of the carcass being bonded so firmly to said metallic filaments that the adhesion of the rubber to the filaments is at least as great as the cohesion of the rubber, whereby separation of the cables from the rubber is avoided.

4. A ply fabric for pneumatic tire casings comprising a plurality of substantially parallel metallic cables formed of a plurality of coreless twisted strands, a layer of unvulcanized rubber surrounding and penetrating into the interstices of said cables, and a bonding substance on the cables and rubber for causing the rubber and the cables to bond so strongly to each other on vulcanization that their adhesion is at least as strong as the cohesion of the rubber.

5. A ply fabric for pneumatic tire casings comprising a layer of unvulcanized rubber, a plurality of substantially parallel metallic cables consisting of a plurality of loosely twisted coreless metal strands imbedded in said rubber, and a bonding substance on the cables and said rubber for causing them to bond so strongly to each other on vulcanization that their adhesion is at least as great as the cohesion of the rubber.

6. A process of making pneumatic tire casings comprising superimposing a plurality of layers of unvulcanized rubber and ply fabric, said ply fabric consisting of a plurality of substantially parallel metallic cables containing a plurality of coreless twisted strands embedded in a layer of unvulcanized rubber and containing an agent for bonding the rubber so strongly to the cables on vulcanization that the adhesion between the cables and the rubber is at least as strong as the cohesion of the rubber, shaping the superimposed layers to the form of a tire casing and vulcanizing.

JACQUES MAURICE THEODORE HAUVETTE.